United States Patent
Hinton

(10) Patent No.: US 8,800,896 B1
(45) Date of Patent: Aug. 12, 2014

(54) MOTORIZED SPREADER ASSEMBLY

(76) Inventor: Johnny L. Hinton, Carson, MS (US)

( * ) Notice: Subject to any disclaimer, the term of this patent is extended or adjusted under 35 U.S.C. 154(b) by 432 days.

(21) Appl. No.: 13/277,918

(22) Filed: Oct. 20, 2011

(51) Int. Cl.
*A01C 3/06* (2006.01)

(52) U.S. Cl.
USPC .......... 239/661; 239/667; 239/668; 239/670; 239/682

(58) Field of Classification Search
USPC ......... 239/656, 661, 667, 668, 670, 682, 684, 239/578
See application file for complete search history.

(56) References Cited

U.S. PATENT DOCUMENTS

| | | | |
|---|---|---|---|
| 5,046,664 A * | 9/1991 | van der Lely et al. | 239/661 |
| D355,820 S | 2/1995 | Tollison | |
| 5,417,171 A | 5/1995 | Poirier et al. | |
| 6,405,665 B1 | 6/2002 | Henry et al. | |
| 6,508,419 B1 * | 1/2003 | Kinkead et al. | 239/668 |
| 6,715,696 B2 * | 4/2004 | Pierce | 239/661 |
| 6,986,313 B2 | 1/2006 | Halford et al. | |
| 7,044,408 B2 * | 5/2006 | Schoenfeld | 239/667 |
| 7,568,438 B2 | 8/2009 | Arksey | |
| 2010/0107942 A1 | 5/2010 | Schilling et al. | |

* cited by examiner

*Primary Examiner* — Steven J Ganey

(57) ABSTRACT

A motorized spreader assembly facilitates efficient and expedited spreading of seed or fertilizer over a large area. The assembly includes a trailer having a hitch arm. A first bin having a bottom opening is coupled to the trailer. A first disc having a top surface is coupled to the trailer. The first disc is positioned under the first bin whereby the top surface of the first disc is configured for receiving granular material passing through the bottom opening in the first bin. A plurality of fins is coupled to the top surface of the first disc and configured for propelling the granular material outwardly from the first disc while the first disc is rotated. An engine is coupled to the trailer and operationally coupled to the first disc for rotating the first disc.

14 Claims, 3 Drawing Sheets

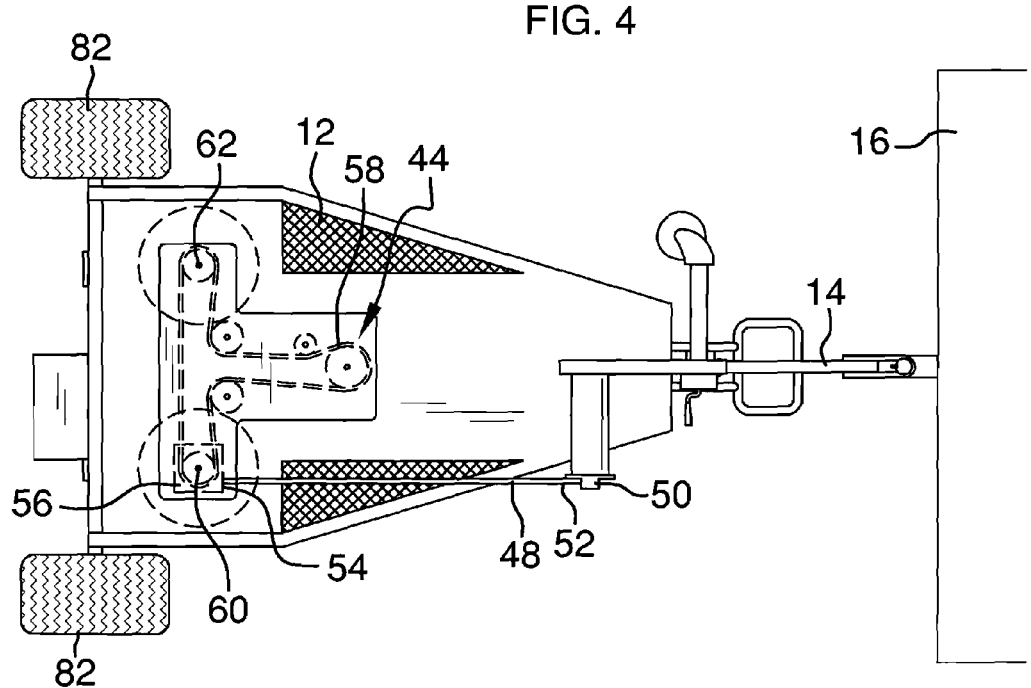
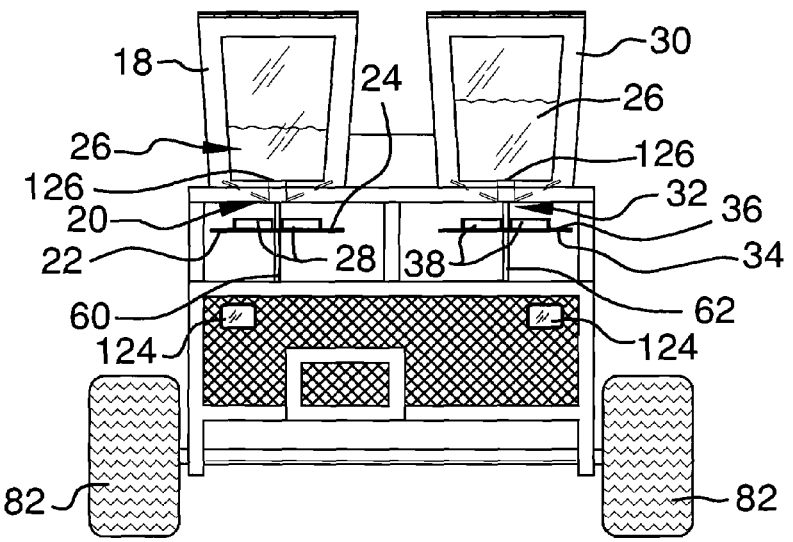

MOTORIZED SPREADER ASSEMBLY

BACKGROUND OF THE DISCLOSURE

Field of the Disclosure

The disclosure relates to spreading devices and more particularly pertains to a new spreading device for facilitating efficient and expedited spreading of seed or fertilizer over a large area.

SUMMARY OF THE DISCLOSURE

An embodiment of the disclosure meets the needs presented above by generally comprising a trailer having a hitch arm configured for coupling the trailer to a vehicle. A first bin having a bottom opening is coupled to the trailer. A first disc having a top surface is coupled to the trailer. The first disc is positioned under the first bin whereby the top surface of the first disc is configured for receiving granular material passing through the bottom opening in the first bin. A plurality of fins is coupled to the top surface of the first disc such that the fins are configured for propelling the granular material outwardly from the first disc when the granular material lands on the top surface of the first disc while the first disc is rotated. An engine is coupled to the trailer and operationally coupled to the first disc for rotating the first disc.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a bottom view of an embodiment of the disclosure.
FIG. 5 is a back view of an embodiment of the disclosure.

DESCRIPTION OF THE PREFERRED EMBODIMENT

Figure 1:
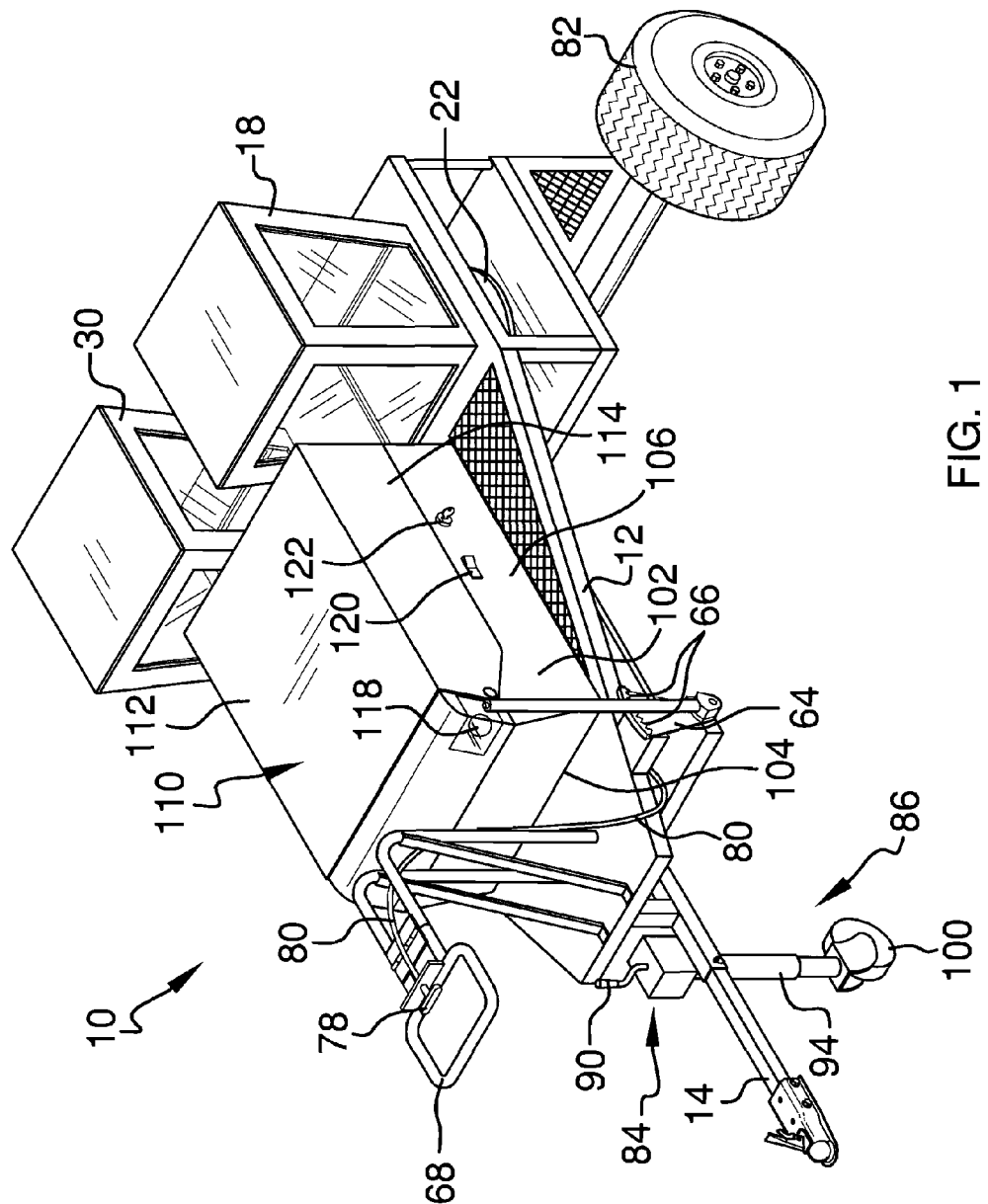
FIG. 1 is a top front side perspective view of a motorized spreader assembly according to an embodiment of the disclosure.
Figure 2:
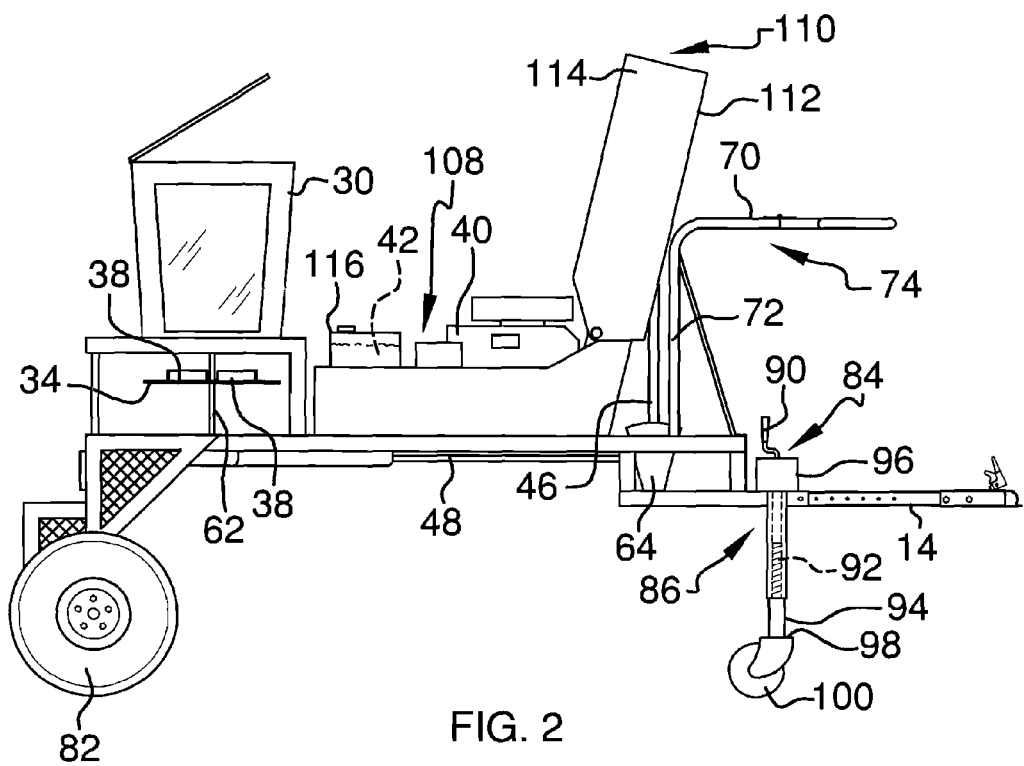
FIG. 2 is a side view of an embodiment of the disclosure.
Figure 3:
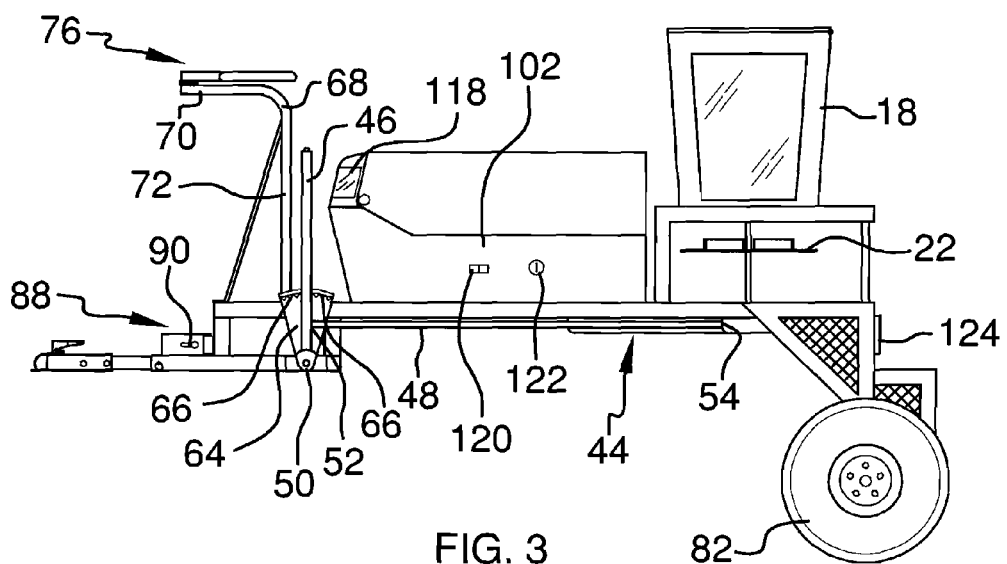
FIG. 3 is a side view of an embodiment of the disclosure.

With reference now to the drawings, and in particular to FIGS. 1 through 5 thereof, a new spreading device embodying the principles and concepts of an embodiment of the disclosure and generally designated by the reference numeral 10 will be described.

As best illustrated in FIGS. 1 through 5, the motorized spreader assembly 10 generally comprises a trailer 12 having a hitch arm 14 configured for coupling the trailer 12 to a vehicle 16. A tail light 124 may be coupled to the trailer 12. A first bin 18 is coupled to the trailer 12. The first bin 18 has a bottom opening 20. A first disc 22 is coupled to the trailer 12. The first disc 22 has a top surface 24. The first disc 22 may be positioned under the first bin 18 such that the top surface 24 of the first disc 22 is configured for receiving granular material 26 passing through the bottom opening 20 in the first bin 18. A plurality of fins 28 is coupled to the top surface 24 in a radial pattern whereby the fins 28 are configured for propelling the granular material 26 outwardly from the first disc 22 when the granular material 26 lands on the top surface 24 of the first disc 22 while the first disc 22 is rotated.

Similarly, a second bin 30 may be coupled to the trailer 12 for holding additional granular material 26. The second bin 30 has a bottom opening 32. A second disc 34 having a top surface 36 is coupled to the trailer 12. The second disc 34 is positioned under the second bin 30 such that the top surface 36 of the second disc 34 is configured for receiving granular material 26 passing through the bottom opening 32 in the second bin 30. A plurality of vanes 38 is coupled to the top surface 36 of the second disc 34 in a radial pattern whereby the vanes 38 coupled to the second disc 34 are configured for propelling the granular material 26 outwardly from the second disc 34 when the granular material 26 lands on the top surface 36 of the second disc 34 while the second disc 34 is rotated.

An engine 40 is coupled to the trailer 12. The engine is operationally coupled to the first disc 22 and the second disc 34 for rotating the first disc 22 and the second disc 34. The engine 40 may be of the type powered by a combustible fluid 42. A drive assembly 44 is operationally coupled to the engine 40 for providing power to the drive assembly 44. The drive assembly 44 includes a lever 46 and a rod 48. The lever 46 is pivotally coupled to the trailer 12 at a lower end 50 of the lever 46. A first end 52 of the rod 48 is coupled to the lever 46 proximate the lower end 50. A second end 54 of the rod 48 is coupled to a gear box 56. The drive assembly 44 further includes a belt drive 58. The belt drive 58 is operationally coupled to the gear box 56 for adjusting a speed of the belt drive 58. The belt drive 58 is further frictionally coupled to a drive shaft 60 of the first disc 22 and a drive shaft 62 of the second disc 34 whereby the first disc 22 and the second disc 34 are rotated at a selectable speed by manipulating the lever 46. A panel 64 may be coupled to the trailer 12 adjacent to the lever 46. The panel 64 may have a plurality of teeth 66 radially positioned for engaging the lever 46 to facilitate holding the lever in a position corresponding to a desired rate of speed for the belt drive 58. The drive shaft 60 of the first disc 22 and the drive shaft 62 of the second disc 34 may each have a top end 126 extending into the first bin 22 and the second bin 30 respectively. The top end 126 may be configured to facilitate drawing the granular material 26 through the bottom openings 20 and 32 respectively when drive shafts 60 and 62 are rotated.

A handle 68 is coupled to the trailer 12. The handle 68 may be generally L-shaped having a horizontally oriented upper portion 70 extending from a vertical portion 72. The upper portion 70 may be manipulated to move the trailer 12 by hand. The upper portion 70 may be folded between an extended position 74 and a retracted position 76. A control assembly 78 may be coupled to the handle 68 and operationally coupled to the engine 40. The control assembly 78 may include a cable 80 manipulatable by a user to adjust running of the engine 40.

A pair of spaced rear wheels 82 is coupled to the trailer 12. A third wheel assembly 84 may be pivotally coupled to the hitch arm 14. The third wheel assembly 84 is pivotable between an extended position 86 and a retracted position 88. The third wheel assembly 84 may include a telescopic leg 94 having an upper end 96 and a lower end 98. The upper end 96 of the telescopic leg 94 is pivotally coupled to the hitch arm 14 to permit the third wheel assembly 84 to be pivoted around the hitch arm 14. The third wheel assembly 84 has a forward wheel 100 coupled to the lower end 98 of the leg 94. A rotating handle 90 may be coupled to a screw drive 92 within the leg 94 used to extend the forward wheel 100 downwardly from the hitch arm 14 when the third wheel assembly 84 is in the extended position 86.

A compartment 102 may be coupled to the trailer 12. The compartment 102 has a bottom 104 and a perimeter wall 106 extending upwardly from the bottom 104 defining an interior 108 of the compartment 102. The engine 40 is positioned in the interior 108 of the compartment 102. A lid 110 is pivotally coupled to the compartment 102. The lid 110 may have a top 112 and an outer wall 114 extending from the top 112. The outer wall 114 is complementary to the perimeter wall 106 of the compartment 102 whereby the lid 110 aligns with the compartment 102 to enclose the interior 108 of the compartment 102. A fluid tank 116 is coupled to the trailer 12 and may be positioned in the interior 108 of the compartment 102.

A forward light 118 may be coupled to the compartment 102 on the outer wall 114 of the lid 110. A light control 120 may be coupled to the compartment 102. A locking mechanism 122 may also be coupled to the compartment 102 for locking the lid 110 onto the compartment 102.

In use, the trailer 12 is coupled to the vehicle 16. The engine 40 is started and adjusted to run as desired. Seed bins 20 and 32 are filled with the granular material 26 such as seed, fertilizer or pest control material. The lever 40 is manipulated corresponding to the desired rate and pattern of distribution for the granular material 26 and the vehicle is then driven over the area to be treated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A motorized spreader assembly comprising:
   a trailer, said trailer having a hitch arm configured for coupling said trailer to a vehicle;
   a first bin coupled to said trailer, said first bin having a bottom opening;
   a first disc coupled to said trailer, said first disc having a top surface, said first disc being positioned under said first bin whereby said top surface of said first disc is configured for receiving granular material passing through said bottom opening in said first bin;
   a plurality of fins coupled to said top surface of said first disc whereby said fins coupled to said first disc are configured for propelling the granular material outwardly from said first disc when the granular material lands on said top surface of said first disc while said first disc is rotated;
   an engine coupled to said trailer, said engine being operationally coupled to said first disc for rotating said first disc; and
   a drive assembly operationally coupled to said engine for powering said drive assembly, said drive assembly having a lever and a rod, a lower end of said lever being coupled to said trailer, a first end of said rod being coupled to said lever proximate said lower end of said lever, a second end of said rod being coupled to a gear box, said drive assembly having a belt drive, said belt drive being operationally coupled to said gear box for adjusting a speed of said belt drive, said belt drive being further frictionally coupled to a drive shaft of said first disc whereby said first disc is rotated at a selectable speed by manipulating said lever.

2. The assembly of claim 1, further including a handle coupled to said trailer, said handle having an upper portion extending from a vertical portion, said upper portion being foldable between an extended position and a retracted position.

3. The assembly of claim 2, further including a control assembly coupled to said handle, said control assembly being operationally coupled to said engine.

4. The assembly of claim 2, further comprising:
   a second bin coupled to said trailer, said second bin having a bottom opening;
   a second disc coupled to said trailer, said second disc having a top surface, said second disc being positioned under said second bin whereby said top surface of said second disc is configured for receiving granular material passing through said bottom opening in said second bin; and
   a plurality of vanes coupled to said top surface of said second disc whereby said vanes coupled to said second disc are configured for propelling the granular material outwardly from said second disc when the granular material lands on said top surface of said second disc while said second disc is rotated.

5. The assembly of claim 1, further including a pair of spaced rear wheels coupled to said trailer.

6. The assembly of claim 1, further including a third wheel assembly being pivotally coupled to said hitch arm, said third wheel assembly being pivotable between an extended position and a retracted position.

7. The assembly of claim 6, further including said third wheel assembly extending downwardly from said hitch arm when said third wheel assembly is in said extended position.

8. The assembly of claim 7, further including said third wheel assembly having a telescopic leg, said telescopic leg having an upper end and a lower end, said upper end of said telescopic leg being pivotally coupled to said hitch arm, said third wheel assembly having a forward wheel coupled to said lower end of said leg.

9. The assembly of claim 1, further including a compartment coupled to said trailer, said compartment having a bottom and a perimeter wall extending upwardly from said bottom defining an interior of said compartment, said engine being positioned in said interior of said compartment.

10. The assembly of claim 9, further including a lid pivotally coupled to said compartment, said lid having a top and an outer wall extending from said top, said outer wall being complementary to said perimeter wall whereby said lid aligns with said compartment to enclose said interior of said compartment.

11. The assembly of claim 10, further comprising:
   said engine being powered by a fluid; and a fluid tank coupled to said trailer, said fluid tank being positioned in said interior of said compartment.

12. The assembly of claim 10, further including a forward light coupled to said outer wall of said lid.

13. The assembly of claim 1, further including a tail light coupled to said trailer.

14. A motorized spreader assembly comprising:
a trailer, said trailer having a hitch arm configured for coupling said trailer to a vehicle;
a first bin coupled to said trailer, said first bin having a bottom opening;
a first disc coupled to said trailer, said first disc having a top surface, said first disc being positioned under said first bin whereby said top surface of said first disc is configured for receiving granular material passing through said bottom opening in said first bin;
a plurality of fins coupled to said top surface of said first disc whereby said fins coupled to said first disc are configured for propelling the granular material outwardly from said first disc when the granular material lands on said top surface of said first disc while said first disc is rotated;
a second bin coupled to said trailer, said second bin having a bottom opening;
a second disc coupled to said trailer, said second disc having a top surface, said second disc being positioned under said second bin whereby said top surface of said second disc is configured for receiving granular material passing through said bottom opening in said second bin; and
a plurality of vanes coupled to said top surface of said second disc whereby said vanes coupled to said second disc are configured for propelling the granular material outwardly from said second disc when the granular material lands on said top surface of said second disc while said second disc is rotated;
an engine coupled to said trailer, said engine being operationally coupled to said first disc and said second disc for rotating said first disc and said second disc, said engine being powered by a combustible fluid;
a drive assembly operationally coupled to said engine for powering said drive assembly, said drive assembly having a lever and a rod, a lower end of said lever being coupled to said trailer, a first end of said rod being coupled to said lever proximate said lower end of said lever, a second end of said rod being coupled to a gear box, said drive assembly having a belt drive, said belt drive being operationally coupled to said gear box for adjusting a speed of said belt drive, said belt drive being further frictionally coupled to a drive shaft of said first disc and a drive shaft of said second disc whereby said first disc and said second disc are rotated at a selectable speed by manipulating said lever;
a handle coupled to said trailer, said handle having an upper portion extending from a vertical portion, said upper portion being foldable between an extended position and a retracted position;
a control assembly coupled to said handle, said control assembly being operationally coupled to said engine;
a pair of spaced rear wheels coupled to said trailer;
a third wheel assembly being pivotally coupled to said hitch arm, said third wheel assembly being pivotable between an extended position and a retracted position, said third wheel assembly extending downwardly from said hitch arm when said third wheel assembly is in said extended position, said third wheel assembly having a telescopic leg, said telescopic leg having an upper end and a lower end, said upper end of said telescopic leg being pivotally coupled to said hitch arm, said third wheel assembly having a forward wheel coupled to said lower end of said leg;
a compartment coupled to said trailer, said compartment having a bottom and a perimeter wall extending upwardly from said bottom defining an interior of said compartment, said engine being positioned in said interior of said compartment;
a lid pivotally coupled to said compartment, said lid having a top and an outer wall extending from said top, said outer wall being complementary to said perimeter wall whereby said lid aligns with said compartment to enclose said interior of said compartment;
a fluid tank coupled to said trailer, said fluid tank being positioned in said interior of said compartment;
a forward light coupled to said outer wall of said lid; and
a tail light coupled to said trailer.

\* \* \* \* \*